July 16, 1957 J. G. INGRES 2,799,252
FLUID PRESSURE OPERATED MOTOR
Original Filed Feb. 15, 1955 3 Sheets-Sheet 3
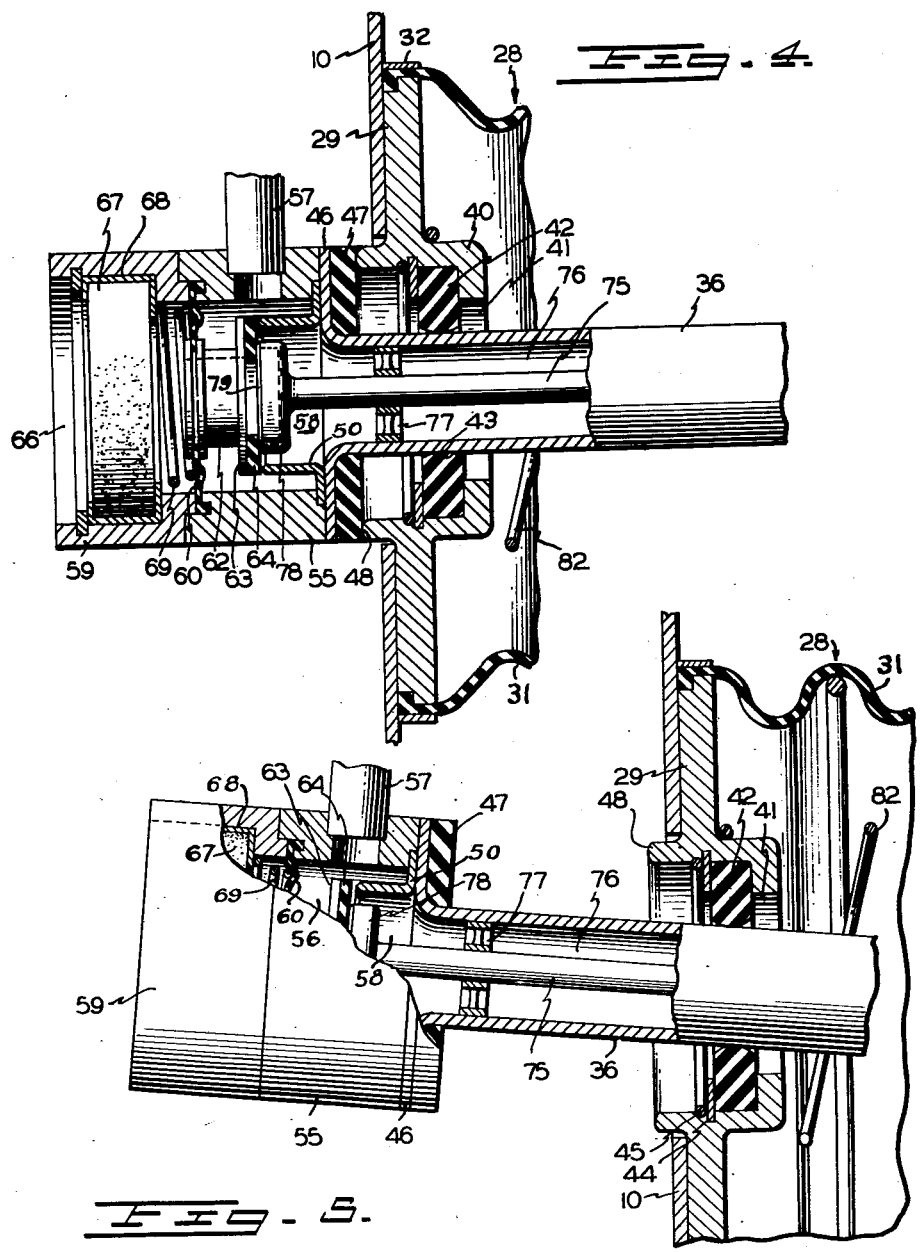
INVENTOR
JEANNOT G. INGRES
BY John F. Phillips
ATTORNEY United States Patent Office 2,799,252
Patented July 16, 1957

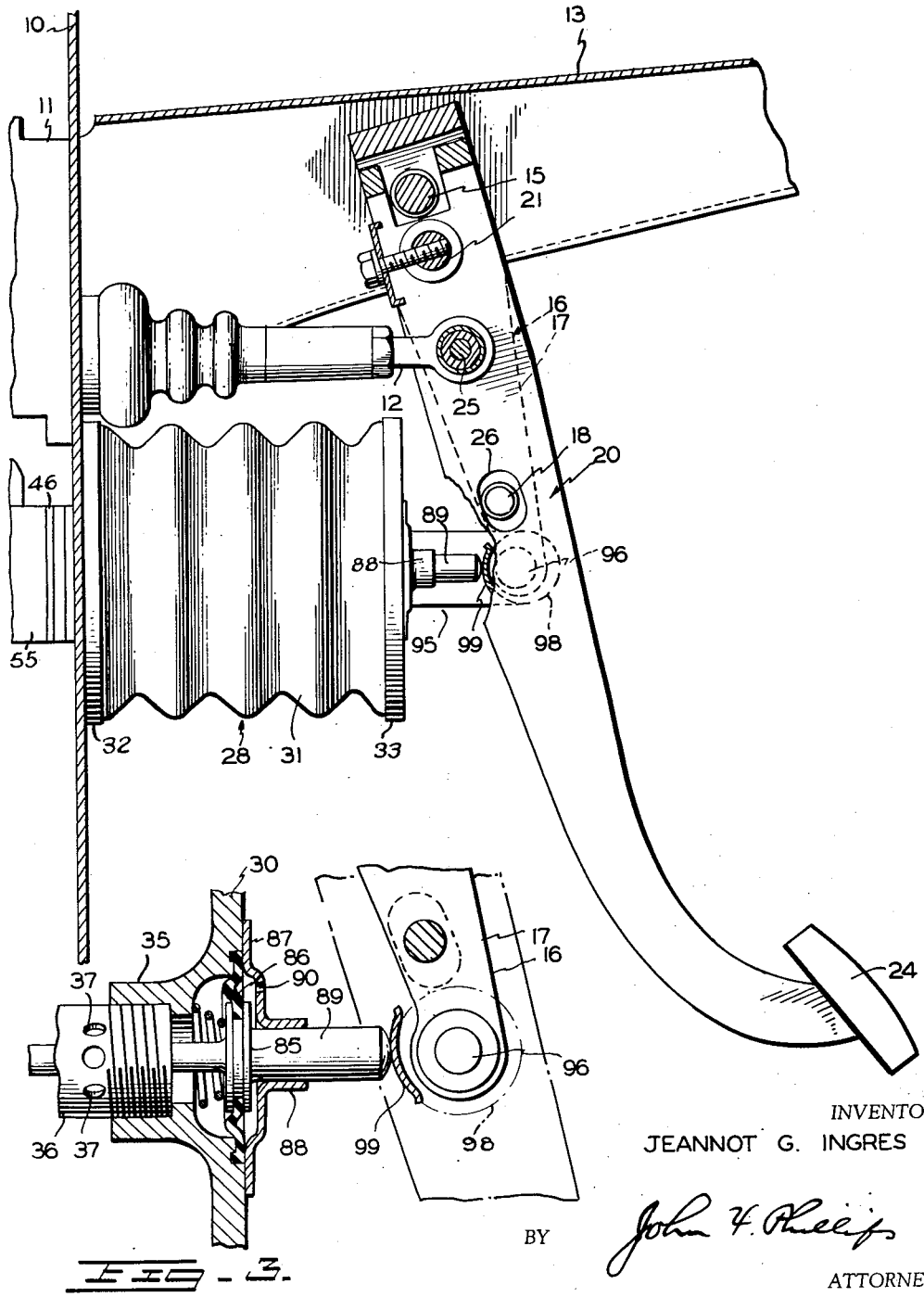

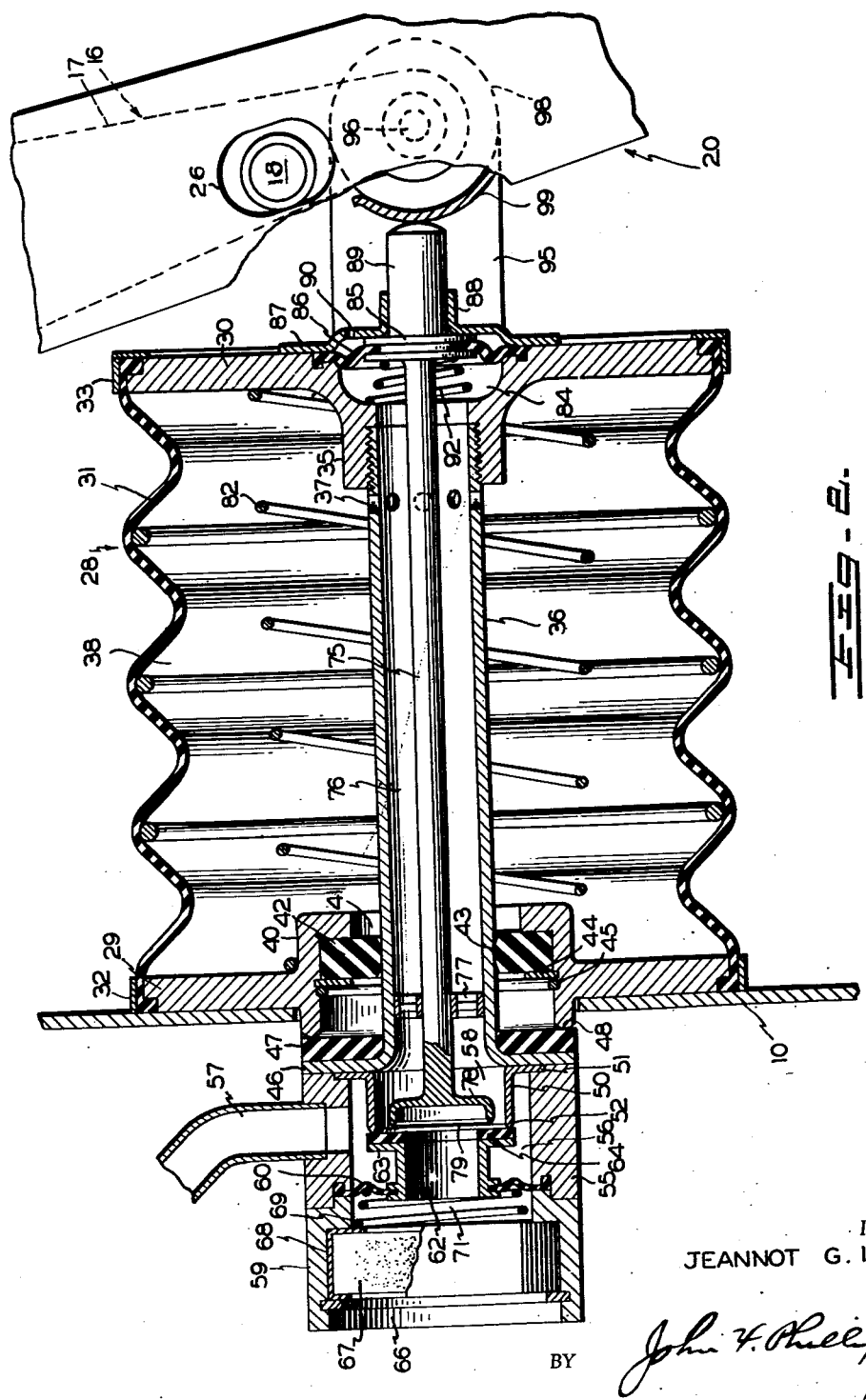

2,799,252

FLUID PRESSURE OPERATED MOTOR

Jeannot G. Ingres, Dearborn, Mich., assignor to Kelsey-Hayes Company, a corporation of Delaware Division of application Serial No. 488,257, February 15, 1955. This application March 14, 1955, Serial No. 494,203

15 Claims. (Cl. 121—41)

This invention relates to a fluid pressure motor and is a division of my copending application, Serial No. 488,257, filed February 15, 1955.

In my copending application referred to I have disclosed a booster brake mechanism employing as part of the combination therein a booster motor which is highly practicable for use in conjunction with a vehicle brake mechanism wherein the valve of the motor is operated by a brake pedal, the motor employing poppet valving to effect efficient sealing of the valve parts against leakage without the presence of pressures tending to oppose movement of the poppet valving, as is usually true in such type of valving.

While the motor shown in the copending application referred to is important in conjunction with the operation of a vehicle brake mechanism, the motor as to certain features thereof is adapted for use as a power source for operating other types of mechanisms.

An important object of the present invention is to provide a novel fluid pressure motor having a follow-up valve mechanism of the poppet type and wherein the valving is pressure balanced to prevent any tendency for the valving to stick or substantially oppose manual operation thereof.

A further object is to provide such a motor wherein the poppet valve mechanism is pressure balanced when the motor is de-energized but becomes slightly pressure unbalanced upon energization of the motor, and to provide novel auxiliary means which becomes effective when the motor is energized for neutralizing the pressure unbalancing of the valving, thus providing for the pressure balancing of the valving under all conditions.

A further object is to provide such a fluid pressure motor wherein the auxiliary pressure balancing means serves the additional function of effectively sealing the motor against the entrance of air thereinto around the externally projecting means which is actuated to move the main control valve of the motor.

Other objects and advantages of the invention will become apparent during the course of the following description.

In the drawings I have shown one embodiment of the invention. In this showing:

Figure 1 is a side elevation of the apparatus, parts being broken away and parts being shown in section;

Figure 2 is an enlarged axial sectional view through the motor, parts being shown in elevation and parts being broken away, the valve parts being shown in motor de-energizing positions;

Figure 3 is a detail fragmentary sectional view showing the valve operating rod and associated elements and the connection thereof with the brake pedal;

Figure 4 is an enlarged fragmentary sectional view through the valve mechanism and associated motor parts, the valve mechanism being shown in lapped position; and Figure 5 is a generally similar view showing the positions of the parts when the motor is energized.

The fluid pressure motor is illustrated in the drawings in conjunction with motor vehicle parts corresponding to the parts shown in the copending application referred to. This showing is for the purpose of illustration only, and it will become apparent that the specific motor forming the subject matter of the present application is capable of uses other than the operation of a vehicle brake mechanism.

Referring to Figures 1, 2 and 4, the numeral 10 designates the conventional fire wall of a motor vehicle against the forward face of which is mounted a conventional master cylinder 11 having the usual fluid displacing plunger (not shown) operable by a push rod 12. The fire wall 10 supports the forward end of a rearwardly extending bracket 13 of substantially inverted U shape. The particular type of bracket 13 makes no difference so far as the present invention is concerned.

The bracket 13 supports a pivot pin 15, and this pin pivotally supports a lever 16 which preferably is of inverted J shape and includes a depending body portion 17. The lever portion 17 carries a transversely extending pin 18 for a purpose to be described.

A pedal lever 20 is pivotally supported with respect to the lever 16 by a pivot pin 21, and it will become apparent that the pedal lever is free to swing independently of the lever 16, within limits, and it will also become apparent that the pivot pin 21, under conditions to be described, moves bodily about the axis of the supporting pin 15.

The pedal lever 20 is provided at its lower end with a pedal pad 24 and is pivotally connected as at 25 to the push rod 12. The pedal lever 20, moreover, is provided with a slot 26 wider than and receiving the pin 18. This pin, when the motor to be described is de-energized, normally engages the left side of the slot 26. This slot is wider than the pin 18 to permit movement of the pedal lever 20, in the initial operation of the device, independently of the lever 16. It will be apparent that initial movement of the pedal lever by pressure on the pedal pad 24 operates the push rod 12.

The motor forming the subject matter of the present invention is preferably of the air suspended vacuum type and is employed for delivering power to the lever 16 or to any other element to be operated. This motor is shown in Figure 2 and is indicated as a whole by the numeral 28. The motor comprises a stationary wall 29 fixed in any suitable manner to the fire wall 10, or any other stationary support, a pressure movable wall 30 spaced from the wall 29, and a connecting bellows 31 fixed at its ends to the respective walls 29 and 30 by clamping rings 32 and 33. The wall 30 is provided with an axial boss 35 internally threaded for connection with the rear end of a tubular member 36 apertured as at 37 adjacent the boss 35 to afford communication at all times between the interior of the tube 36 and the chamber 38 in the motor, defined by the walls 29 and 30 and bellows 31.

The motor wall 29 is provided with a hub portion 40 having a relatively large opening 41 through which the tube 36 extends. The hub 40 carries a highly resilient sealing ring 42 having a curved central opening 43 through which the tube 36 extends. Deformable sealing means also may be mounted in the left-hand end of the hub 40 in Figure 2. It will become apparent that the tube 36 is slidable through the seal 42 and changes its angle relative to the axis of the hub 40, as shown in Figure 5. The seal 42 may be retained in position in any suitable manner, for example by a retaining ring 44 maintained in position by a snap ring 45.

The forward end of the tube 36 is provided with an outstanding annular flange 46 to which is connected in any suitable manner a rubber or similar bumper and seal member 47 engageable with the forward extremity 48 of the hub 40. An annular cylindrical valve seat member 50 is provided with an annular flange 51 seating against the flange 46 and maintained in position in a manner to be described. The forward extremity of the member 30 terminates in a valve seat 52.

A cylindrical body 55 is secured in any suitable manner to the flange 46 and retains the flange 51 in position as will be clear in Figures 2, 4 and 5. The body 55 forms a chamber 56 communicating with an elbow or nipple 57 to which is suitably connected a flexible conduit leading to a source of vacuum such as the intake manifold of the vehicle engine. The valve seat member 50 divides the vacuum chamber 56 from a variable pressure chamber 58 within the member 50.

A cylindrical housing 59 is fixed in any suitable manner against the forward end of the body 55 and cooperates therewith to secure in position therebetween the outer periphery of a flexible diaphragm 60. This diaphragm is fixed at its radially inner end to a valve body or thimble 62 having a flange 63 at the end opposite the diaphragm 60. Fixed to the flange 63 is a resilient valve element 64 engageable with the seat 52.

The housing 59 is open-ended as at 66 and contains an air cleaner 67 retained in a sheet metal housing 68. A spring 69 seats at one end against the housing 68 and has its rear end engaging the diaphragm 60. The spring 69 may be very light. Rearwardly of the air cleaner 67, this member and associated elements define a chamber 71 which obviously is always open to the atmosphere and, accordingly, atmospheric pressure is always present within the valve body 62.

A rod 75 is mounted axially in the tube 36 and defines therewith an annular passage 76 extending therethrough. The forward end of the rod 75 is supported by a spider 77 and carries at such end a cupped member 78 the forward edge 79 of which forms a valve seat engageable under conditions to be described with valve element 64. Normally, the valve seat 79 is spaced from the valve 64, thus opening the annular passage 76 to the atmosphere through thimble 62, and atmospheric pressure will be maintained in the motor chamber 38 through openings 37. Obviously, the parts are held in normal motor de-energized positions with the valve seat 79 unseated, by a return spring 82 in the motor 28.

The rod 75 extends into a recess 84 in the rear face of the head 30 and the rod is flanged as at 85 for connection with the inner edge of an annular diaphragm 86. The outer edge of this diaphragm is maintained in sealing engagement with the head 30 by a cap 87. This cap has a cylindrical rearward sleeve extension 88 in which is slidable a button 89 fixed to the flange 85, the flanged portion, button 89 and rod 75 preferably being integral. The rear face of the diaphragm 86 is exposed at all times to atmospheric pressure through a port 90 through the cap 87. A light spring 92 is arranged between the bottom of the recess 84 and the flanged portion 85 to urge the latter into engagement with the cap 87, thus limiting rearward movement of the rod 75 with the valve seat 79 disengaged from the valve element 64.

Offset from the axis thereof, the head 30 is provided with a relatively heavy rearwardly extending boss or arm 95 connected by pivot pin 96 to the lower end of the body 17 of the lever 16. Accordingly, it will be apparent that when the motor is energized to move the head 30 toward the left in Figure 1, the boss 95 will effect similar movement of the pin 96 to turn the lever 16 about the pivot pin 15.

The pedal lever 20 has fixed thereagainst a plate 98 provided with an arcuately shaped lateral extension 99 projecting across the axis of and engaging with the button 89 whereby the latter, together with the rod 75 and valve seat 79 will be moved to the left upon initial depression of the pedal pad 24.

Operation

As previously stated, the fluid pressure motor forming the subject matter of the present invention has been illustrated in conjunction with a vehicle brake mechanism, and the brake mechanism as such can be disregarded so far as the present invention is concerned. Generally speaking, the pedal lever 20 constitutes a member manually movable to effect movement of the valve 79, while the lever 16 constitutes merely any type of movable element connected to the pressure head of the motor to be operated thereby.

All of the parts occupy the normal positions shown in Figures 1 and 2. When the motor is to be operated, manual movement of the button 89 toward the left in Figure 2 is effected to first move the valve seat 79 into engagement with the valve 64. The valve parts will now be in lap position, the interior of the thimble 62, which is open to the atmosphere, being now cut off from communication with the chamber 58 and accordingly with the motor. The lap positions of the parts are shown in Figure 4.

Further movement of the valve seat 79 toward the left, in engagement with the valve 64, moves this valve away from the seat 52, thus connecting the vacuum chamber 56 to the chamber 58 to exhaust air from the motor through the ports 37 and annular passage 76. The movable pressure head 30 will now start to move toward the left, due to atmospheric pressure against the outer face thereof, and power will be delivered to the lever 16. This movement continues so long as the valve 64 is maintained off the seat 52, as shown in Figure 5, or until the motor is energized to its maximum extent. If, prior to maximum motor energization, pressures on the button 89 is relieved, a very slight additional movement of the pressure head 30, communicated to the valve seat 52 through the tube 36, will engage the valve seat 52 with the valve 64 to restore the valve parts to lap position and arrest movement of the head 30.

When pressure on the button 89 is fully released, the spring 92 moves the rod 75 toward the right in Figure 2, whereupon the valve 64 will firmly engage the valve seat 52 and the valve seat 79 will move away from the valve 64. The motor chamber 38 will now be disconnected from the source of vacuum and its communication with the atmosphere restored, whereupon the spring 82 returns the head 30 to its normal off position. Movement to such position is limited by engagement of the bumper 47 with the hub end 48. The bumper serves to silence return movement of the parts to normal position. Incidentally, while the seal 42 is sufficient under most operating conditions, further sealing of the hub 40 relative to the tube 36 may be provided, if desired, by placing an additional seal in the space within the left-hand end of the hub 40.

The valve mechanism and associated parts are highly important in the functioning of the apparatus. The valve is of the poppet type, thus providing perfect sealing in any position of the valve. However, the nature of the structure is such that the valve mechanism is perfectly pressure balanced, thus eliminating the necessity for the operator's having to exert force at any time to change the positions of the valves. Thus the device provides a valve mechanism which is as easily operable as a spool or sleeve valve without the disadvantage of fluid leakage around the valve.

Referring to Figure 2 wherein the valve parts are shown in motor de-energizing position, it will be noted that atmospheric pressure is present at the right-hand side of the valve element 64 while vacuum is present to the left of the flange 63, thus creating a net pressure tending to move the valve element 64 to the left. This net valve-unseating pressure, however, is balanced by pressures affecting the diaphragm 60. Assuming that there is an imaginary line around the diaphragm 60 intermediate the radial width thereof, all pressures within such line will be transmitted through the diaphragm to the thimble 62. Pressures radially outwardly of such imaginary line will be transmitted through the diaphragm to the relatively stationary elements 55 and 59. Radially inwardly of the imaginary line referred to there will be vacuum present to the right of the diaphragm 60 and air pressure to the left thereof. These pressures create a net force tending to move the thimble 62 and consequently the valve 64 toward the right. The imaginary line referred to is of a radius approximately equal to the radius of the valve seat 52; hence, the net pressures tending to move the thimble 62 and valve 64 to the left are exactly balanced by the net forces tending to move these elements toward the right. It requires virtually no force, therefore, to unseat the valve element 64 from the valve seat 52. When the motor is de-energized as in Figure 1, it will be obvious that atmospheric pressure is present on both sides of the diaphragm 86 carried by the pressure movable head 30. This diaphragm therefore is pressure balanced and has no effect on the rod 75 and valve seat 79. Thus the spring 69 may be extremely light. However, when the valve seat 79 picks up the valve element 64 and moves it out of engagement with the valve seat 52, a substantially greater area of the right-hand face of the valve element 64 will be subjected to vacuum than is true when the motor is de-energized. The net pressure acting toward the right on the diaphragm 60, therefore, would in itself tend to return the valve element 64 into engagement with the valve seat 52, thus requiring the application of appreciable force from the brake pedal to maintain the valve 64 open.

When the motor is energized, however, vacuum is present in the space 76, and acordingly the left-hand face of the diaphragm 86 is exposed to vacuum. The right-hand face of this diaphragm is always exposed to atmospheric pressure through port 90 and, accordingly, there will be a net pressure acting to the left against the diaphragm 86 to overcome the net pressure tending to move the valve element 64 against the seat 52. The net pressures tending to move the diaphragm 86 toward the left will be greater than the net pressures tending to move the thimble 62 toward the right and this difference in pressures is compensated for by the spring 92. The increased pressures tending to seat the valve 64 during motor energization, therefore, are substantially exactly balanced by the net pressure tending to move the diaphragm 86 toward the left, minus the tension of the spring 92.

From the foregoing it will be apparent that the present construction renders wholly practicable the use of poppet valving with its attendant well-known advantages and without the disadvantages of requiring force for moving any of the valve parts under any conditions. The pressure balancing of the parts permits the operator to move the valves with the requirement of only negligible force, thus rendering the valve mechanism smoothly manually operable with the exertion of minimum force. All of the valve parts are carried by the moving parts of the motor and the same is true of the air cleaner 67, thus facilitating assembly and installation. Moreover, the placing of the parts connected to the source of vacuum forwardly of the fire wall 10 effectively eliminates any objection to the sound of air rushing into and out of the motor chamber. Moreover, since the head 30 of the motor is supported by the pin 96 spaced outwardly of the head 30, there is a tendency for the motor head to swing downwardly about the axis of the pin 96, which tendency is prevented by the rigid tube 36.

It will be understood that the form of the invention shown and described is to be taken as a preferred example of the same and that such changes in the shape, size and arrangement of parts may be made as do not depart from the scope of the appended claims.

I claim:

1. A fluid pressure motor comprising a stationary head, a movable head spaced therefrom and a bellows connecting said heads and forming therewith a motor chamber, a hollow member fixed to said movable head and projecting through said stationary head in sealed relation thereto and communicating with said motor chamber, a first valve seat carried by said hollow member outwardly of said stationary head, a movable valve seat within and concentric with said first valve seat, a housing carried by said hollow member and surrounding said valve seats, a valve body in said housing having a valve element engageable with said seats, said movable seat being normally spaced from said valve element and said valve element normally engaging said first seat to disconnect said housing from the interior of said first valve seat, said valve body having an atmospheric passage therethrough normally communicating with said hollow member, the interior of said housing communicating with a source of vacuum, and means for effecting movement of said movable valve seat to engage it with said valve element and move the latter out of engagement with said first valve seat to disconnect the interior of said hollow member from said atmospheric opening and connect it to the interior of said housing.

2. A fluid pressure motor comprising a stationary head, a movable head spaced therefrom and a bellows connecting said heads and forming therewith a motor chamber, a hollow member fixed to said movable head and projecting through said stationary head in sealed relation thereto and communicating with said motor chamber, a first valve seat carried by said hollow member outwardly of said stationary head, a movable valve seat within and concentric with said first valve seat, a housing carried by said hollow member and surrounding said valve seats, a valve body in said housing having a valve element engageable with said seats, said movable seat being norally spaced from said valve element and said valve element normally engaging said first seat to disconnect said housing from the interior of said first valve seat, said valve body having an atmospheric passage therethrough normally communicating with said hollow member, the interior of said housing communicating with a source of vacuum, and an operating rod connected at one end to said movable valve seat and projecting through said hollow member and beyond said movable head to be operable externally of said movable head to move said movable valve seat into engagement with said valve element and to disengage the latter from said first valve seat, thereby disconnecting the interior of said hollow member from said atmospheric passage and connecting it to the interior of said housing to exhaust air from said motor chamber whereby said movable head is moved toward said stationary head by atmospheric pressure outwardly of said movable head.

3. A motor according to claim 2 wherein said housing defines therewithin a vacuum chamber, and a flexible diaphragm forming one wall of said vacuum chamber and connected at its radially outer and inner edges respectively with said housing and said valve body and supporting the latter in said housing.

4. A motor according to claim 2 provided with a diaphragm fixed at its radially outer edge to said movable head and at its radially inner edge to said operating rod to seal the space within said hollow member from the atmosphere through said movable head.

5. A motor according to claim 2 provided with a diaphragm fixed at its radially outer edge to said movable head and at its radially inner edge to said operating rod to seal the space within said hollow member from the atmosphere through said movable head, said housing forming therewithin a vacuum chamber, and a second diaphragm forming one wall of said vacuum chamber, said second diaphragm being fixed at its radially outer and inner edges respectively to said housing and said valve body and supporting the latter in said housing.

6. A motor according to claim 2 wherein said housing defines therewithin a vacuum chamber, and a flexible diaphragm forming one wall of said vacuum chamber and connected at its radially outer and inner edges respectively with said housing and said valve body and supporting the latter in said housing, said valve body, said valve element and said diaphragm, when said valve element and said second seat are in normal positions, having equal and oppositely facing areas subject to vacuum in said vacuum chamber and to atmospheric pressure to pressure-balance said valve element whereby the latter is movable out of engagement with said first valve seat without fluid pressure opposition.

7. A motor according to claim 2 wherein said housing defines therewithin a vacuum chamber, and a flexible diaphragm forming one wall of said vacuum chamber and connected at its radially outer and inner edges respectively with said housing, and said valve body and supporting the latter in said housing, said valve body, said valve element and said diaphragm, when said valve element and said second seat are in normal positions, having equal and oppositely facing areas subject to vacuum in said vacuum chamber and to atmospheric pressure to pressure-balance said valve element whereby the latter is movable out of engagement with said first valve seat without fluid pressure opposition, said valve element, said valve body and said diaphragm being pressure-unbalanced by movement of said movable valve seat to disengage said valve element from said first seat to thereby subject a greater area of said valve element to vacuum, and means for compensating for such pressure-unbalance when said valve element is disengaged from said first valve seat.

8. A motor according to claim 2 wherein said housing defines therewithin a vacuum chamber, and a flexible diaphragm forming one wall of said vacuum chamber and connected at its radially outer and inner edges respectively with said housing and said valve body and supporting the latter in said housing, said valve body, said valve element and said diaphragm, when said valve element and said second seat are in normal positions, having equal and oppositely facing areas subject to vacuum in said vacuum chamber and to atmospheric pressure to pressure-balance said valve element whereby the latter is movable out of engagement with said first valve seat without fluid pressure opposition, said valve element, said valve body and said diaphragm being pressure-unbalanced by movement of said movable valve seat to disengage said valve element from said first seat to thereby subject a greater area of said valve element to vacuum, a sealing diaphragm connected at its radially outer and inner edges respectively to said movable head and to said operating rod to close communication between the interior of said hollow member and the atmosphere, the outer face of said sealing diaphragm being open to the atmosphere and such diaphragm being pressure-balanced when said valve element and said movable valve seat are in normal positions, and a spring interposed between said movable head and said operating rod to bias said movable seat to its normal position disengaged from said valve element.

9. A fluid pressure operated motor comprising a stationary head, a movable head spaced therefrom and a bellows connecting said heads and forming therewith a motor chamber, a rigid tube fixed at one end to said movable head and projecting through said motor chamber and through said stationary head in sealed relation to the latter, a first annular valve seat carried by said tube outwardly of said stationary head and projecting therefrom, a second annular valve seat of smaller diameter than and arranged coaxially within said first valve seat, a housing carried by said tube and surrounding said first annular valve seat and forming a vacuum chamber, the space within said first valve seat forming a variable pressure chamber communicating with the interior of said tube, said tube having ports adjacent said movable head communicating with said motor chamber, a valve body in said housing having a valve element coaxial with and engageable with said seats, said valve element normally engaging said first seat and said second seat being normally disengaged from said valve element, means closing one end of said vacuum chamber and supporting said valve body for movement toward and away from said seats, and control means accessible from a point externally of said movable head for moving said second valve seat into engagement with said valve element and moving said valve element out of engagement with said first valve seat, said valve body having an atmospheric passage therethrough normally connecting said variable pressure chamber to the atmosphere and being closed by said second valve seat when the latter is moved into engagement with said valve element to disconnect said variable pressure chamber from the atmosphere.

10. A motor according to claim 9 wherein said means for supporting said valve body for movement in said housing comprises a diaphragm connected at its radially outer and inner edges respectively with said housing and with said valve body.

11. A motor according to claim 9 wherein said means for supporting said valve body for movement in said housing comprises a diaphragm connected at its radially outer and inner edges respectively with said housing and with said valve body, said valve element, said valve body and said diaphragm having equal oppositely facing pressure areas subject to vacuum in said vacuum chamber and to atmospheric pressure to pressure-balance said valve element when the latter and said movable valve seat are in normal positions.

12. A motor according to claim 9 wherein said control means comprises an operating rod connected at one end to said movable valve seat and projecting through said tube and through said movable head to be engageable externally of the latter to move said second valve seat, and a diaphragm connected at its radially outer and inner edges respectively with said movable head and said operating rod.

13. A motor according to claim 9 wherein said control means comprises an operating rod connected at one end to said movable valve seat and projecting through said tube and through said movable head to be engageable externally of the latter to move said second valve seat, and a diaphragm connected at its radially outer and inner edges respectively with said movable head and said operating rod, said operating rod having a button portion projecting outwardly of said movable head, a cap carried by said movable head and having a bearing supporting said button portion, said cap having an atmospheric opening therethrough, and a spring arranged between said movable head and said operating rod to bias said movable valve seat out of engagement with said valve element.

14. A motor comprising a stationary wall, a movable wall spaced therefrom, a bellows connecting said walls and defining therewith a motor chamber, a valve mechanism for controlling pressures in said chamber, said valve mechanism comprising a housing, a first annular valve seat in said housing dividing the latter to form a relatively low pressure chamber and a variable pressure chamber, a poppet valve in said low pressure chamber normally engaging said seat, a movable valve seat within said first valve seat concentric therewith and normally spaced from said valve, said valve having an opening therethrough normally connecting said variable pressure chamber to a source of relatively high pressure, and means for moving said movable valve seat in one direction to engage said valve and move it from said first valve seat to open said variable pressure chamber to said low pressure chamber and to close the opening in said valve, said variable pressure chamber communicating with said motor chamber, said valve mechanism having substantially equal pressure areas exposed to the pressure in said low pressure chamber and to said source of relatively high pressure when said valve engages said first seat and said movable seat is in normal position, whereby said valve negligibly resists movement away from said first valve seat upon operation of said movable valve seat into engagement therewith.

15. A motor comprising a stationary wall, a movable wall spaced therefrom, a bellows connecting said walls and defining therewith a motor chamber, a valve mechanism for controlling pressures in said chamber, said valve mechanism comprising a housing, a first annular valve seat in said housing dividing the latter to form a relatively low pressure chamber and a variable pressure chamber, a poppet valve in said low pressure chamber normally engaging said seat, a movable valve seat within said first valve seat concentric therewith and normally spaced from said valve, said valve having an opening therethrough normally connecting said variable pressure chamber to a source of relatively high pressure, and means for moving said movable valve seat in one direction to engage said valve and move it from said first valve seat to open said variable pressure chamber to said low pressure chamber and to close the opening in said valve, said variable pressure chamber communicating with said motor chamber, a tubular valve body carrying said valve, and an annular diaphragm connected between said valve body and said housing and forming one end of said low pressure chamber and sealing the latter from said source, said valve and said valve body and said diaphragm having substantially equal pressure areas subject respectively to pressure in said low pressure chamber and to the pressure of said source when said valve engages said first seat and said movable valve seat is disengaged from said valve whereby said valve negligibly resists movement away from said first valve seat upon said movement of said movable valve seat.

References Cited in the file of this patent

UNITED STATES PATENTS

| | | |
|---|---|---|
| 1,582,118 | Bragg | Apr. 27, 1926 |
| 1,809,015 | Bragg | June 9, 1931 |
| 1,878,786 | Lombard | Sept. 20, 1932 |
| 1,960,481 | Monge | May 29, 1934 |
| 2,197,075 | Fitzgerald | Apr. 16, 1940 |
| 2,667,861 | Rockwell | Feb. 2, 1954 |